United States Patent [19]
Iwanami et al.

[11] Patent Number: 5,911,964
[45] Date of Patent: *Jun. 15, 1999

[54] METHOD FOR REDUCING CARBON DIOXIDE USING A CATALYST FOR REDUCTION OF CARBON DIOXIDE

[75] Inventors: Hikoichi Iwanami; Takashi Yoshizawa; Takashi Suzuki, all of Saitama, Japan

[73] Assignees: Cosmo Research Institute; Cosmo Oil Co., Ltd., both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/571,431

[22] Filed: Dec. 13, 1995

Related U.S. Application Data

[63] Continuation-in-part of application No. 08/265,209, Jun. 25, 1994, abandoned.

[30] Foreign Application Priority Data

Jun. 25, 1993 [JP] Japan ................................. 5-180780
Sep. 23, 1993 [JP] Japan ................................. 5-261904

[51] Int. Cl.⁶ ................................. C10B 31/18
[52] U.S. Cl. ................................. 423/418.2; 432/415.1; 432/210; 432/247
[58] Field of Search ................. 423/418.2, 415.1, 423/210, 247

[56] References Cited

U.S. PATENT DOCUMENTS

| | | | |
|---|---|---|---|
| 4,159,201 | 6/1979 | Staege | 75/91 |
| 4,383,982 | 5/1983 | Pinto | 423/359 |
| 4,460,704 | 7/1984 | Twigg | 502/302 |
| 5,346,679 | 9/1994 | Osaki et al. | 423/210 |
| 5,496,530 | 3/1996 | Vannby et al. | 423/418.2 |

FOREIGN PATENT DOCUMENTS

WO 9606064 2/1996 WIPO.

OTHER PUBLICATIONS

Abstract, Fujita, Shiniichiro et al., "Methanol Synthesis from Carbon Dioxide at atmospheric pressure over copper/zinc oxide catalyst . . . ". Catal. Lett., (1992), 13(4), 349–58, 1992.

Abstract, Hoeltje, Jens Ulrich, "Macrokinetics of Heterogenously Catalyzed synthesis of methanol from Carbon Dioxide and Hydrogen", Forchungzent. Juelich: Ber (Jul. 1991).

*Primary Examiner*—Bekir L. Yildirim
*Attorney, Agent, or Firm*—Sughrue, Mion, Zinn, Macpeak & Seas, PLLC

[57] ABSTRACT

A catalyst for the reduction of carbon dioxide which comprises employing a catalyst which contains at least one transition metal selected from the group consisting of Group VIII (e.g., Ni, Fe, Co, Ru, Rh) and Group VIa (e.g., Mo, W) in the Periodic Table on zinc oxide alone or on a composite containing zinc oxide and at least one metal oxide of a metal selected from the group consisting of Group IIIb (e.g., Al, Ga) and Group IVa (e.g, Ti, Zr) in the Periodic Table.

22 Claims, 1 Drawing Sheet

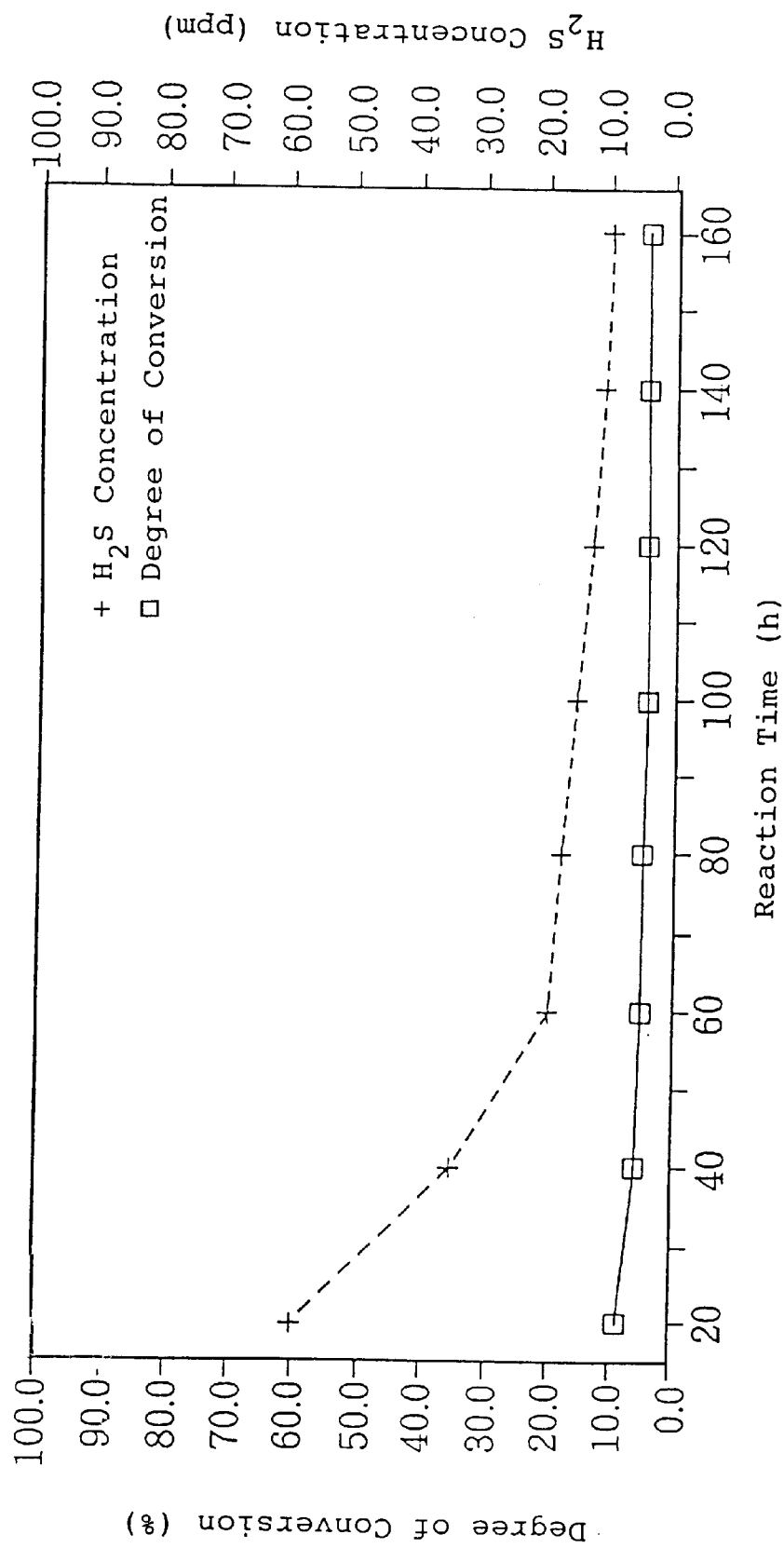
Fig.
(Comparative Example 3)

METHOD FOR REDUCING CARBON DIOXIDE USING A CATALYST FOR REDUCTION OF CARBON DIOXIDE

CROSS-REFERENCE TO RELATED APPLICATION

This is a continuation-in-part application of U.S. application Ser. No. 08/265,209, filed Jun. 25, 1995, now abandoned.

FIELD OF THE INVENTION

The present invention relates to a method for the chemical reduction of carbon dioxide which can produce carbon monoxide by the reduction of carbon dioxide using hydrogen. In particular, the present invention relates to a method for the reduction of carbon dioxide which can be suitably applied even when, as a raw material gas, a sulfur compound, such as H$_2$S and/or a large amount of carbon monoxide, is present in a raw material system.

BACKGROUND OF THE INVENTION

The hydrogenation of carbon dioxide by hydrogen has been known and industrialized as a method for the production of a hydrocarbon using a precious metal (e.g., Ru, Rh) type catalyst or a Ni type catalyst, as shown in the following reaction formula. According to this reaction, methane can be readily produced with high selectivity, and it hardly produces CO.

$$CO_2 + 4H_2 \leftrightarrows CH_4 + 2H_2O$$

On the other hand, carbon monoxide alone or mixed with hydrogen in an equimolar amount (called oxo gas) is useful as a raw material for methanol synthesis, acrylic acid synthesis, formic acid synthesis, fatty acid synthesis, acetic acid synthesis, oxo synthesis (hydroformylation), and carbonyl synthesis, etc.

In general, carbon monoxide is produced by the steam reforming process of a light hydrocarbon.

In the steam reforming process, a light hydrocarbon (e.g., methane), water and carbon dioxide are reacted in the presence of a catalyst to change the reactants to a gas containing H$_2$/CO$_2$/CO, then CO$_2$ in the gas is absorbed by an amine solution and the like, whereby a mixed gas of H$_2$ with CO is obtained, or which may be further deeply cooled to separate CO.

Recently, in the production of carbon monoxide, research has become active to solidify and utilize CO$_2$ as resources in view of global environmental protection. For this purpose, research has been conducted to develop a catalyst which is capable of producing CO with high selectivity by the reduction of carbon dioxide as a raw material using hydrogen, as shown in the following reaction formula.

$$CO_2 + H_2 \leftrightarrows CO + H_2O$$

This reaction is to selectively produce CO without forming a hydrocarbon.

A catalyst used in this reaction is required to have a degree of conversion to the equilibrium degree of conversion as its activity and high selectivity, so such a catalyst is severely difficult to design. Accordingly, if any sulfur compound such as H$_2$S is in a raw material gas, the catalyst is poisoned instantly with a sulfur compound.

As an improved catalyst for this purpose, JP-A-4-363142 discloses a tungsten sulfide catalyst and a molybdenum sulfide catalyst. (The term "JP-A" as used herein means an "unexamined published Japanese patent application".)

These catalysts are prepared by previously treating ammonium tetrathiotungstate [(NH$_4$)$_2$WS$_4$] or ammonium tetrathiomolybdate [(NH$_4$)$_2$MoS$_4$] under H$_2$ stream at 300 to 400° C. to prepare WS$_2$ or MoS$_2$.

Also, there are catalysts such as MoS$_2$/TiO$_2$, MoS$_2$/Al$_2$O$_3$ which are prepared by dipping a carrier such as TiO$_2$, Al$_2$O$_3$, SiO$_2$ in the above-mentioned aqueous ammonium sulfide solution to which an aqueous ammonia is added for support, followed by drying and pretreatment.

These catalysts are not poisoned with a sulfur compound, since a metal sulfide is used as a catalyst active component.

Moreover, it is known that these catalysts are capable of producing CO in the reduction reaction of carbon dioxide using a mixed gas of carbon dioxide and hydrogen with high selectivity without forming a hydrocarbon.

Furthermore, since these catalysts do not suffer the poisoning function from a sulfur compound as discussed above, they are also advantageous in that no removal of H$_2$S is required.

However, in cases where a large amount of CO is contained in a raw material gas, it is generally known, as shown in the following reaction formulas, that they remarkably form a hydrocarbon and/or deposit a carbon, further they bring about the deactivation of these catalysts due to CO.

$$CO + (m/2n+1)H_2 \ V0 \to 1/n \times C_nH_m + H_2O \text{ (formation of a hydrocarbon)}$$

$$2CO \to CO_2 + C \text{ (deposition of a carbon)}$$

In addition, in cases where a slight amount of sulfur compound is contained or no sulfur compound is contained in a raw material gas, a metal sulfide as a catalyst active component is reduced with hydrogen to form H$_2$S in the reaction of carbon dioxide with hydrogen, then the H$_2$S is transferred to a reaction product in the CO$_2$—H$_2$ system, and, as a result, the catalyst is deactivated.

Furthermore, regardless of the presence or absence of a sulfur compound, such as H$_2$S, in a raw material gas, any post-treatment for removing H$_2$S is required due to the transferred H$_2$S in the reaction product.

On the other hand, a reaction gas is condensed and circulated after separation of a great amount of unreacted CO$_2$ in the process of forming an oxo gas (CO/H$_2$=1) by the steam reforming process and in the process of separating CO conducted by deeply cooling the resulting oxo gas. Accordingly, when a sulfur compound such as H$_2$S is slipped into a formed gas in the course of the reduction of a catalyst, the sulfur compound is condensed at the same time in the course of CO$_2$ separation and CO$_2$ condensation steps and the condensed sulfur compound is introduced to a reforming reactor, then a reforming catalyst is unfavorably poisoned, which is observed in using a sulfide catalyst. In this process, it is important to decrease an amount of unreacted CO$_2$ for cost saving. For this purpose, it is essentially required to conduct the reverse shift reaction of a reforming gas containing CO, CO$_2$, H$_2$ to decrease the amount of CO$_2$ in the gas. Generally, in cases where CO is present, it brings about remarkable catalyst poisoning, carbon deposition, and hydrocarbon formation, etc.

SUMMARY OF THE INVENTION

An object of the present invention is to provide a method for the reduction of carbon dioxide by employing a catalyst which is capable of selectively reducing CO$_2$ to CO by hydrogen, even when using a mixed gas of CO$_2$ and H$_2$ in which a great amount of CO is contained in a raw material system and which is resistant to poisoning by sulfur or sulfur compounds.

This and other objects of the present invention have been attained by a method for reducing carbon dioxide by hydrogen in the presence of a catalyst, wherein the catalyst comprises a transition metal on a carrier comprising zinc oxide alone or on a carrier comprising zinc oxide and at least one metal oxide of a metal selected from metals in Group IIIb and Group IVa in the Periodic Table.

In a preferred embodiment, the metal oxide selected from Group IIIb and Group IVa in the Periodic Table includes a metal oxide of Al, Ga, Ti or Zr or a composite metal oxide of two or more metal oxides of Al, Ga, Ti and Zr. In a preferred embodiment, the transition metal includes a metal belonging to Group VIII and Group VIa in the Periodic Table, and more preferably, it includes Ni, Fe, Co, Ru, Rh, Pt, Pd, Mo and W.

The catalyst in the method according to the present invention is used in a reaction for obtaining carbon monoxide through the reduction of carbon dioxide by hydrogen. Even when a sulfur compound such as $H_2S$ is present in a mixed gas of carbon dioxide and hydrogen, the catalyst in the method according to the present invention can produce carbon monoxide with high selectivity and without poisoning.

The present invention is based on the following findings which were obtained in research and development relating to a carbon dioxide reduction method for obtaining carbon monoxide by the reduction of carbon dioxide with hydrogen. Specifically, by using a catalyst carrying a transition metal on a zinc oxide alone or a composite having a zinc oxide and a metal oxide selected from either Group IIIb or Group IVa or both in the Periodic Table, inclusive of a catalyst which is developed for the deep desulfurization of a middle or light distillate oil, (1) even though a sulfur compound such as $H_2S$ is present in a raw material gas, these catalysts are not poisoned with it, then the catalytic life is prolonged, and further the final product is not contaminated with $H_2S$, thereby no $H_2S$ removal treatment is required, and (2) in particular, in cases where a composite of a zinc oxide, a titanium oxide and an aluminum oxide is used as a carrier, even though CO is contained in an amount similar to $CO_2$ in a raw material gas, the hydrogenation of $CO_2$ to CO proceeds selectively without accompanying any side reaction such as the poisoning of a catalyst, the deposition of a carbon and the formation of a hydrocarbon.

Thus, the present invention has been completed.

BRIEF EXPLANATION OF DRAWING

The FIGURE is a graph showing a change of the degree of $CO_2$ conversion and a change of the $H_2S$ concentration in a formed gas with the lapse of reaction time when the catalyst in Comparative Example 3 was used.

DETAILED DESCRIPTION OF THE INVENTION

In the catalyst employed in the method according to the present invention, exemplary carriers include a zinc oxide alone, a zinc oxide-containing metal oxide selected from Group IIIb and Group IVa in the Periodic Table (e.g., a metal oxide of Al, Ga, Ti, Zr) or a composite thereof (e.g., a composite of zinc oxide and titanium oxide, a composite of zinc oxide and aluminum oxide, a composite of zinc oxide, titanium oxide and aluminum oxide). The term "composite" as used throughout the present specification means "a mixture".

In particular, in the case using a composite of zinc oxide and titanium oxide or aluminum oxide as a carrier, the catalyst employed in the method according to the present invention is hardly poisoned with a sulfur compound and CO even though a great amount of CO is contained as well as a sulfur compound such as $H_2S$ in the above-mentioned mixed gas.

The amount of zinc oxide in a carrier generally ranges from about 20 to 100 wt %, preferably from 20 to 60 wt %, based on the total amount of the carrier. If the amount of zinc oxide is too small, the catalytic life is not sufficiently prolonged. Almost all the sulfur compound, such as $H_2S$, in a raw material gas is absorbed in the zinc oxide of a carrier, whereby it is considered that the active component is not poisoned and the catalytic life is prolonged. Accordingly, in a case containing no zinc oxide, these effects cannot be obtained, which results in a short catalytic life.

Furthermore, the carrier comprising zinc oxide and at least one metal oxide of a metal selected from the metals in Group IIIb and Group IVa in the Periodic Table has more improved mechanical strength than the carrier comprising zinc oxide along. In particular, in a case using a carrier comprising zinc oxide, titanium oxide and aluminum oxide, the selectivity of carbon monoxide is improved and the resistance to CO poisoning and the resistance to coke formation are improved as compared with a carrier comprising zinc oxide alone as demonstrated in the working examples of the present invention.

If the amount of the metal oxide or composite metal oxide of metals selected from the metals in Group IIIb and IVa in the Periodic Table in a carrier is too small, the resulting effects are insufficient, in contrast, if too much, the amount of a zinc oxide becomes relatively small, and the $H_2S$ absorption effect decreases. Accordingly, it is preferred that the metal oxide or composite metal oxide of metals selected from the metals in Group IIIb and IVa in the Periodic Table in a carrier is used in an amount from about 0 to 80 wt %, preferably from 40 to 80 wt %, based on the total amount of the carrier.

In cases where titanium oxide and aluminum oxide are used together, their mixing ratio is not limited, and it is acceptable that the total amount thereof is from about 40 to 80 wt % based on the total amount of the carrier.

Any transition metal may be used as an active component. In particular, it is preferred to use a metal belonging to Group VIII in the Periodic Table (especially, Ni, Fe, Co, Ru, Rh, Pt, Pd) or a metal belonging to Group VIa in the Periodic Table (especially, Mo, W). These transition metal may be used alone or in a mixture of two or more.

The carrying amount of a transition metal (when two or more are used in a mixture, it is the total amount thereof) is not limited, but it generally ranges from about 5 to 20 wt % based on the total amount of the catalyst, provided that the amount is calculated by converting the amount of the transition metal to that of the metal oxide thereof.

If the amount of the transition metal is too small, it is insufficient to produce carbon monoxide with high selectivity in the reduction of carbon dioxide by hydrogen and insufficient to make a sulfur compound, such as $H_2S$, in a raw material gas which is capable of easily absorbing to zinc oxide. If too much, these effects are saturated, thus there is no technical significance and rather it is uneconomical.

For instance, the catalyst employed in the present invention is obtained by i) preparing a carrier using a zinc compound alone or a zinc compound and either one or both of an aluminum compound and/or a titanium compound, i.e., a metal oxide selected from Group IIIb or Group IVa, ii) then, according to a usual manner, impregnating a transition metal to the resulting carrier, followed by drying and calcining.

A zinc compound and a metal oxide selected from Group III are used in the form of a hydroxide, a chloride, an oxide, and the like of the selected element to be used.

A transition metal is used in the form of a hydroxide, a nitrate, an acetate, a chloride, and the like of the transition metal.

In cases where zinc oxide is used alone as a carrier, it is prepared, for example, by calcining metal zinc or by heat-decomposing an inorganic zinc salt (e.g., zinc nitrate, basic zinc carbonate) or an organic zinc (e.g., zinc benzoate, zinc citrate, zinc lactate).

In cases of a composite of zinc oxide and a metal oxide selected from either Group IIIb or Group IVa or both, it is prepared, for example, by mixing a titanium hydroxide or an aluminum hydroxide or a mixture thereof with a zinc hydroxide, or by adding alkali to a titanium compound or an aluminum compound other than the hydroxide or a mixture thereof for co-precipitation, followed by washing, molding and calcining, according to a usual manner.

In a composite of a zinc oxide and a metal oxide selected from either Group IIIb or Group IVa or both, the mixing order of each components (inclusive of a hydroxide) is not limited. For instance, it may be prepared by mixing a mixture of a titanium compound and an aluminum compound with a zinc compound as described above, or by mixing a mixture of either a titanium compound or an aluminum compound and a zinc compound with the other non-mixed compound thereof.

Otherwise, a carrier having desired properties for the catalyst employed in the present invention may be prepared by only mixing a powder of a zinc oxide, a titanium oxide, an aluminum oxide, etc. in a prescribed amount.

A transition metal may be carried on the above-prepared carrier according to a conventional method such as an impregnation method and a co-precipitation method.

As an example, in a case carrying Ni as a transition metal on a carrier made of a zinc oxide alone, water is gradually added dropwise to a zinc oxide for water absorbing at the inside of the zinc oxide. It is preferred that the water absorbing is conducted until it is saturated at the inside of the zinc oxide. Next, the necessary Ni amount is calculated by the saturated water absorbing amount and the zinc oxide amount. Then, an aqueous Ni salt (e.g., a nitrate, an acetate, a chloride) solution which has been adjusted to an appropriate concentration based on the calculated Ni amount, is absorbed in the zinc oxide until it is saturated, followed by washing, drying, molding, and calcining.

It is similar in cases where two or more transition metals are carried on a composite as carrier. For instance, i) water is absorbed at the inside of the composite (preferably until it is saturated), ii) the necessary transition metal amounts (the total amount of two transition metals) are calculated by the saturated water absorbing amount and the zinc oxide amount in the composite, iii) an aqueous transition metals solution which has been adjusted to an appropriate concentration based on the calculated transition metals amount, is absorbed until it is saturated, following by washing, etc. as mentioned above.

According to the present invention the catalyst is used to obtain carbon monoxide in the reduction of carbon dioxide by hydrogen, and a suitable carbon monoxide production can be achieved, even though a sulfur compound, such as $H_2S$, is present in a raw material gas, or in a case using a composite of zinc oxide, titanium oxide, and aluminum oxide as a carrier, a great amount of CO is present in the raw material gas.

In the reaction using a catalyst according to the method of the present invention, it is preferred to conduct the reaction at a temperature of about 400° C. or more, more preferably at about 500 to 600° C. under a pressure of about 20 kg/cm$^2$ or less, more preferably atmospheric pressure to about 5 kg/cm$^2$, and GHSV of about 1000 to 30000h$^{-1}$.

As discussed above, the catalyst employed in the present invention can provide the following effects:

(1) Even though a sulfur compound, such as $H_2S$, is present in a raw material gas for obtaining carbon monoxide by reduction reaction of carbon dioxide by hydrogen, the catalyst employed in the present invention is not poisoned, then the catalytic life is prolonged.

(2) Since the final product obtained by the reduction reaction is not contaminated with $H_2S$ by the reduction of the catalyst, no $H_2S$ removal treatment is required.

(3) In particular, in cases where a composite of zinc oxide, titanium oxide and aluminum oxide is used as a carrier, even though CO is contained in an amount similar to $CO_2$ in a raw material gas, the reduction reaction proceeds favorably with improved selectivity without accompanying any side reaction such as the poisoning of a catalyst, the deposition of carbon and the formation of a light hydrocarbon.

(4) Accordingly, by conducting the above-mentioned reduction reaction, carbon monoxide can be produced with a high degree of conversion and high selectivity.

The method according to the present invention is of great industrial value for obtaining an oxo gas and the like.

The present invention will be further described in the following examples, but the present invention should not be construed as being limited thereto.

In the following examples, each reaction product (gas) was analyzed by means of a gas chromatography equipped with a thermal conductive detector (TCD), by charging 60/80 mesh of an active carbon to a column (made of SUS) having I.D. (Inner Diameter) of 3 mm$\phi$×2 m. $H_2S$ was detected by a gas indicator tube (Kitagawa type).

EXAMPLE 1

20 g of a carrier obtained by mixing 9.8 g of titanium oxide powder, 5.7 g of zinc oxide powder and 4.5 g of aluminum oxide powder was dipped in an aqueous solution of 9.91 g of nickel(II) nitrate hexahydrate [Ni(NO$_3$)$_2$.6H$_2$O] in 20 ml of water for 1 hour. After removal of the residual solution, the resulting product was dried at 120° C. for 12 hours and calcined at 600° C. for 3 hours. Then, a catalyst having NiO: 12.4 wt %, ZnO: 21.2 wt %, and balance: TiO$_2$ and Al$_2$O$_3$ was obtained.

8 ml of the catalyst thus obtained was charged in a cylindrical reaction tube having an inner diameter of 16 mm$\phi$ and 50 ml/min of H$_2$ was passed thereto under normal pressure at 350° C. for 6 hours.

Thereafter, using the catalyst, a reduction reaction of CO$_2$ by H$_2$ was conducted with a mixed gas of H$_2$:CO$_2$ (1:1) as a raw material gas under normal pressure at 600° C. and GHSV=3000h$^{-1}$.

The results are shown in Table 1.

EXAMPLE 2

20 g of a carrier which was prepared in the same manner as in Example 1 was dipped in an aqueous solution of 9.88 g of cobalt(II) nitrate hexahydrate [Co(NO$_3$)$_2$.6H$_2$O] dissolved in 20 ml of water. After removal of the residual solution, the resulting product was dried at 120° C. for 12 hours and calcined at 600° C. for 3 hours. Then, a catalyst having CoO: 12.7 wt %, ZnO: 21.5 wt %, and balance: TiO$_2$ and Al$_2$O$_3$ was obtained.

Using the catalyst thus obtained, a reduction reaction was conducted in the same manner as in Example 1.

The results are shown in Table 1.

EXAMPLE 3

In an aqueous ammonium para-molybdate solution in which 5.2 g of ammonium para-molybdate tetrahydrate [(NH$_4$)$_6$Mo$_7$O$_{24}$.4H$_2$O] was dissolved in 20 ml of water and aqueous ammonia was dropwise added thereto was dipped 20 g of a carrier which was prepared in the same manner as in Example 1 for 1 hour. After removal of the residual solution, the resulting product was dried at 120° C. to 12 hours and calcined at 600° C. for 3 hours. Then, a catalyst having MoO$_3$: 15 wt %, ZnO: 21.3 wt %, balance: TiO$_2$ and Al$_2$O$_3$ was obtained.

Using the catalyst thus obtained, a reduction reaction was conducted in the same manner as in Example 1.

The results are shown in Table 1.

EXAMPLE 4

A catalyst having NiO: 19.1 wt %, ZnO: 81.9 wt % was prepared in the same manner as in Example 1, except that 20 g of a carrier made of zinc oxide alone (a molded product of "G-72" produced by Girdler Co.) and an aqueous solution of 19.86 g of nickel(II) nitrate hexahydrate [Ni(NO$_3$)$_2$.6H$_2$O] dissolved in 20 ml of water were used.

Using the catalyst thus obtained, a reduction reaction was conducted in the same manner as in Example 1.

The results are shown in Table 1.

COMPARATIVE EXAMPLE 1

A catalyst having NiO: 12.4 wt % and balance: TiO$_2$ and Al$_2$O$_3$ was prepared in the same manner as in Example 1, except that 20 g of a carrier made from a mixture of 10 g of titanium oxide powder and 10 g of aluminum oxide powder was used.

Using the catalyst thus obtained, a reduction reaction was conducted in the same manner as in Example 1.

The results are shown in Table 1.

TABLE 1

|  | Ex. 1 | Ex. 2 | Ex. 3 | Ex. 4 | Comp. Ex. 1 |
|---|---|---|---|---|---|
| Formed Gas Composition: (Vol %) |  |  |  |  |  |
| H$_2$ | 40.4 | 41.3 | 41.9 | 37.5 | 41.0 |
| CO | 21.0 | 20.2 | 18.5 | 22.0 | 20.8 |
| CO$_2$ | 38.5 | 38.4 | 39.6 | 39.3 | 38.1 |
| CH$_4$ | 0.1 | 0.1 | 0.0 | 1.2 | 0.1 |
| Degree of Conversion: (%) | 35.0 | 34.0 | 32.0 | 36.6 | 34.9 |
| Selectivity: (%) | 99.5 | 99.5 | 100 | 94.8 | 99.5 |
| Equilibrium Degree of Conversion: (%) | 38.5 | 38.5 | 38.5 | 38.5 | 38.5 |

In the results of Table 1, the degree of conversion and the selectivity are calculated by the following two equations, and the equilibrium degree of conversion means a theoretical degree of conversion.

$$\text{Degree of Conversion (\%)} = \frac{(CO_2 \text{ Mol. Number in Raw Material Gas}) - (CO_2 \text{ Mol. Number in Formed Gas})}{CO_2 \text{ Mol. Number in Raw Material Gas}} \times 100$$

$$\text{Selectivity (\%)} = \frac{(CO_2 \text{ Mol. Number in Formed Gas}) - (CO_2 \text{ Mol. Number in Raw Material Gas})}{(CO_2 \text{ Mol. Number in Raw Material Gas}) - (CO_2 \text{ Mol. Number in Formed Gas})} \times 100$$

EXAMPLE 5

A reduction reaction was conducted in the same manner as in Example 1, except that a catalyst prepared in the same manner as in Example 4 was used and a mixed gas of H$_2$:CO$_2$ (1:1) containing 200 ppm of H$_2$S was used as a raw material gas.

The results are shown in Table 2.

TABLE 2

|  | Reaction Time | | |
|---|---|---|---|
|  | 50 Hr | 100 Hr | 150 Hr |
| Formed Gas Composition (Vol %): |  |  |  |
| H$_2$ | 37.4 | 37.5 | 37.5 |
| CO | 21.9 | 22.0 | 22.0 |
| CO$_2$ | 39.5 | 39.5 | 39.5 |
| CH$_4$ | 1.2 | 1.1 | 1.1 |
| Degree of Conversion (%): | 36.5 | 36.5 | 36.5 |
| Selectivity (%): | 94.8 | 95.2 | 95.2 |
| Outlet H$_2$S Concentration (ppm): | 0 | 0 | 0 |

COMPARATIVE EXAMPLE 2

A reduction reaction was conducted in the same manner as in Example 1, except for using a catalyst prepared in the same manner as in Comparative Example 1 and a mixed gas prepared in the same manner as in Example 5.

The results are shown in Table 3.

TABLE 3

|  | Reaction Time | | |
|---|---|---|---|
|  | 50 Hr | 100 Hr | 150 Hr |
| Formed Gas Composition (Vol %): |  |  |  |
| H$_2$ | 47.1 | 48.4 | 49.3 |
| CO | 8.5 | 3.7 | 0.8 |
| CO$_2$ | 44.4 | 47.9 | 49.9 |
| CH$_4$ | 0.0 | 0.0 | 0.0 |
| Degree of Conversion (%): | 16.0 | 7.1 | 1.5 |
| Selectivity (%): | 100 | 100 | 100 |
| Outlet H$_2$S Concentration (ppm): | 18 | 92 | 183 |

The results of Tables 1 to 3 support the following: regardless of the presence of zinc oxide in a carrier of a catalyst, when a sulfur compound such as $H_2S$ was not present in a raw material gas, a high degree of conversion was achieved. However, when a sulfur compound, such as $H_2S$, was present in a raw material gas, in cases using a catalyst containing no zinc oxide in a carrier, $H_2S$ was passed into a formed gas or the catalyst was poisoned with a sulfur compound such as $H_2S$, whereby the degree of conversion was decreased and the catalytic life was shortened.

In cases using the catalysts according to the method of the present invention, no $H_2S$ was observed in a formed gas and, since the catalytic life was prolonged, the catalyst were not poisoned.

COMPARATIVE EXAMPLE 3

8 ml of a commercially available molybdenum disulfide was charged to a cylindrical reaction tube having an inner diameter of 16 mm$\phi$. Using this, a reduction reaction of $CO_2$ by $H_2$ was conducted with a mixed gas of $H_2$:$CO_2$ (1:1) under normal pressure at 600° C. and GHSV=3000h$^{-1}$. Then, a change of the degree of conversion and a change of the $H_2S$ concentration in a formed gas with the lapse of a reaction time were determined.

From the FIGURE, it is apparent that when a metal sulfide is used as a catalyst, a sulfide as a catalytic component is reduced by hydrogen to form $H_2S$ even though no sulfur compound, such as $H_2S$, is present in a raw material gas, the formed $H_2S$ is transferred to a formed gas, whereby the catalytic activity is decreased.

EXAMPLE 6

Using the catalyst prepared in the same manner as in Example 1, a reduction of $CO_2$ was conducted continuously in the same manner as in Example 1, except that a mixed gas of $H_2$ (49.7 vol %), CO (28.4 vol %), $CO_2$ (21.8 vol %) and $CH_4$ (0.1 vol %) containing 200 ppm of $H_2S$ was used as a raw material gas.

The results with the lapse of 24 hours and the lapse of 200 hours are shown in Table 4.

EXAMPLE 7

20 g of a carrier which was prepared in the same manner as in Example 1 was dipped in an aqueous solution of 26.15 g of iron(III) nitrate nonahydrate [Fe(NO$_3$)$_3$.9H$_2$O] dissolved in 20 ml of water for 1 hour. After removal of the residual solution, resulting product was dried at 120° C. for 12 hours and calcined at 600° C. for 3 hours. Then, a catalyst having Fe$_2$O$_3$: 20.5 wt %, ZnO: 21.2 wt %, and balance: TiO$_2$ and Al$_2$O$_3$ was obtained.

Using the catalyst thus obtained, a reduction reaction was conducted in the same manner as in Example 6.

The results with the lapse of 24 hours and the lapse of 200 hours are shown in Table 4.

EXAMPLE 8

A reduction reaction was conducted in the same manner in Example 6, except for using the catalyst which was prepared in the same manner as in Example 3.

The results with the lapse of 24 hours and the lapse of 200 hours are shown in Table 4.

TABLE 4

| Reaction | Example 6 | | Example 7 | | Example 8 | |
|---|---|---|---|---|---|---|
| Time: (Hr) | 24 | 200 | 24 | 200 | 24 | 200 |
| Formed Gas Composition: (Vol %) | | | | | | |
| $H_2$ | 45.7 | 46.0 | 46.1 | 46.5 | 44.8 | 44.7 |
| CO | 36.7 | 35.7 | 36.4 | 35.1 | 37.1 | 37.2 |
| $CO_2$ | 17.3 | 17.9 | 17.3 | 18.1 | 17.9 | 17.9 |
| $CH_4$ | 0.3 | 0.4 | 0.2 | 0.3 | 0.2 | 0.2 |
| Degree of Conversion: | 27.2 | 24.5 | 26.9 | 23.4 | 25.8 | 26.0 |
| Selectivity: (%) | 94.4 | 88.9 | 93.2 | 85.1 | 97.0 | 96.7 |
| C-Balance: (%) | 99.7 | 99.3 | 99.4 | 98.8 | 99..8 | 99.8 |

In Table 4, the degree of conversion and the selectivity were calculated by the same equations described earlier in Table 1. The C-balance is a mass balance of a raw material system and a formed material system, and the lower C-balance means the deposition of carbon on a catalyst.

As is apparent from Table 4, in cases using a catalyst according to the method of the present invention, especially a catalyst using a composite of a zinc oxide, a titanium oxide and an aluminum oxide as a carrier, even though a great amount of CO is present in a raw material gas, the degree of conversion and the selectivity are not decreased with the lapse of time, and the catalyst is not poisoned with CO in the raw material gas, or the C-balance is not decreased.

Also, it is apparent that when a great amount of CO is present in a raw material gas, it is preferred to use a catalyst which carries a molybdenum oxide on such a composite.

EXAMPLE 9

Preparation of Catalyst A

In 20 ml of water, 25.0 g of zinc oxide powder and 2.5 g of ammonium para-molybdate were added, and dipped therein for 1 hour after aqueous ammonia was dropwise added thereto. After removal of the residual solution, the resulting product was dried at 120° C. for 12 hours and calcined at 600° C. for 3 hours. Then a catalyst A having MoO$_3$ (7.5 wt %) and ZnO (92.5 wt %) was obtained.

Preparation of Catalyst B

A carrier of 20 g was prepared by mixing 9.8 g of titanium oxide powder, 5.7 g of zinc oxide powder, and 4.5 g of aluminum oxide powder. The carrier was dipped for 1 hour in 22.6 ml of a solution obtained by dissolving 5 g of ruthenium trichloride hydrate (RuCl$_3$.nH$_2$O, assay 44–45%, produced by Mitsuwa Chemical Co., Ltd.) in 30 ml of water. After removal of the residual solution, the resulting product was dried at 120° C. for 12 hours and calcined at 600° C. for 3 hours. Then, a catalyst B having RuO$_2$ (10.0 wt %), ZnO (25.6 wt %), balance: TiO$_2$ and Al$_2$O$_3$, was obtained.

Using the catalyst A or B thus obtained, a reduction reaction was conducted in the same manner as in Example 1. The catalyst was evaluated in the same manner as in Example 1.

The results are shown in Table 5 below.

TABLE 5

|  | Catalyst A | Catalyst B |
| --- | --- | --- |
| Formed Gas Composition: (Vol %) | | |
| $H_2$ | 41.3 | 41.0 |
| CO | 20.2 | 20.8 |
| $CO_2$ | 38.4 | 38.1 |
| $CH_4$ | 0.1 | 0.1 |
| Degree of Conversion: (%) | 34.0 | 34.9 |
| Selectivity: (%) | 99.5 | 99.5 |
| Equilibrium Degree of Conversion: (%) | 38.5 | 38.5 |

While the invention has been described in detail and with reference to specific embodiments thereof, it will be apparent to one skill in the art that various changes and modifications can be made therein without departing from the spirit and scope thereof.

What is claimed is:

1. A method for reducing carbon dioxide by hydrogen in the presence of a catalyst where the reaction proceeds in the absence of an accompanying hydrocarbon forming side reaction, wherein said catalyst comprises a transition metal on a carrier comprising zinc oxide alone or on a carrier comprising zinc oxide and at least one metal oxide of a metal selected from metals in Group IIIb and IVa in the Periodic Table.

2. The method as claimed in claim 1, wherein the metal oxide is selected from the group consisting of a metal oxide of Al, Ga, Ti or Zr and a composite metal oxide of two or more metal oxides of Al, Ga, Ti and Zr.

3. The method as claimed in claim 1, wherein the transition metal is at least one metal selected from those in Group VIII and Group VIa in the Periodic Table.

4. The method as claimed in claim 1, wherein the transition metal is at least one metal selected from the group consisting of Ni, Fe, Co, Ru, Rh, Pt, Pd, Mo and W.

5. The method as claimed in claim 1, wherein the transition metal is present in the catalyst in an amount of 5 to 20 wt % based on the total amount of the catalyst.

6. The method as claimed in claim 1, wherein the zinc oxide is present in the catalyst in an amount of 20 to 100 wt % based on the total amount of the carrier.

7. The method as claimed in claim 1, wherein the catalyst comprises a transition metal on a carrier comprising zinc oxide and titanium oxide.

8. The method as claimed in claim 1, wherein the catalyst comprises a transition metal on a carrier comprising zinc oxide and aluminum oxide.

9. The method as claimed in claim 1, wherein the catalyst comprises a transition metal on a carrier comprising zinc oxide, titanium oxide and aluminum oxide.

10. The method as claimed in claim 1, wherein the zinc oxide is present in the catalyst in an amount of 20 to 60 wt % based on the total amount of the carrier.

11. The method as claimed in claim 1, wherein the transition metal comprises molybdenum present as oxide, and the carrier comprises zinc oxide and aluminum oxide.

12. The method as claimed in claim 1, wherein the transition metal comprises nickel present as oxide, and the carrier comprises zinc oxide and aluminum oxide.

13. The method as claimed in claim 11, wherein molybdenum is present as oxide in the catalyst in an amount of 5 to 20 wt % based on the total amount of the catalyst.

14. The method as claimed in claim 11, wherein the zinc oxide is present in the catalyst in an amount of 20 to 60 wt % based on the total amount of the carrier.

15. The method as claimed in claim 12, wherein nickel is present as oxide in the catalyst in an amount of 5 to 20 wt % based on the total amount of the catalyst.

16. The method as claimed in claim 12, wherein the zinc oxide is present in the catalyst in an amount of 20 to 60 wt % based on the total amount of the carrier.

17. A method for reducing carbon dioxide by hydrogen in the presence of a catalyst, wherein said catalyst comprises molybdenum present as oxide on a carrier comprising zinc oxide and aluminum oxide.

18. A method for reducing carbon dioxide by hydrogen in the presence of a catalyst, wherein said catalyst comprises nickel present as oxide on a carrier comprising zinc oxide and aluminum oxide.

19. The method as claimed in claim 17, wherein molybdenum is present as oxide in the catalyst in an amount of 5 to 20 wt % based on the total amount of the catalyst.

20. The method as claimed in claim 17, wherein the zinc oxide is present in the catalyst in an amount of 20 to 60 wt % based on the total amount of the carrier.

21. The method as claimed in claim 18, wherein nickel is present as oxide in the catalyst in an amount of 5 to 20 wt % based on the total amount of the catalyst.

22. The method as claimed in claim 18, wherein the zinc oxide is present in the catalyst in an amount of 20 to 60 wt % based on the total amount of the carrier.

* * * * *